Jan. 21, 1969  H. D. HEWITT  3,423,124
SAFETY SEAT FOR AUTOMOBILE
Filed Nov. 8, 1967
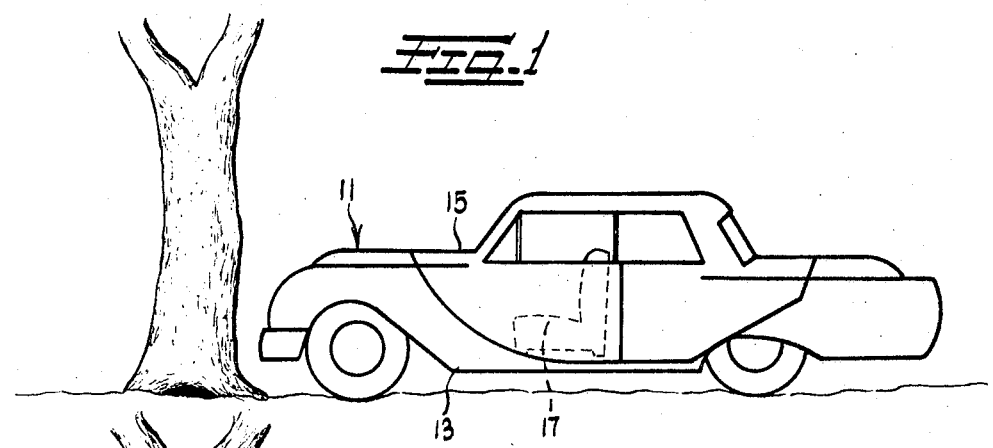
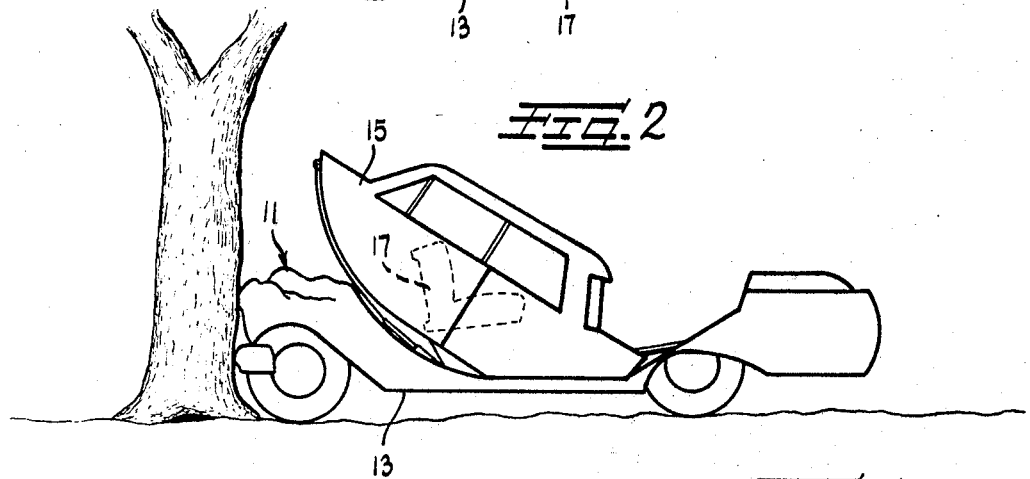
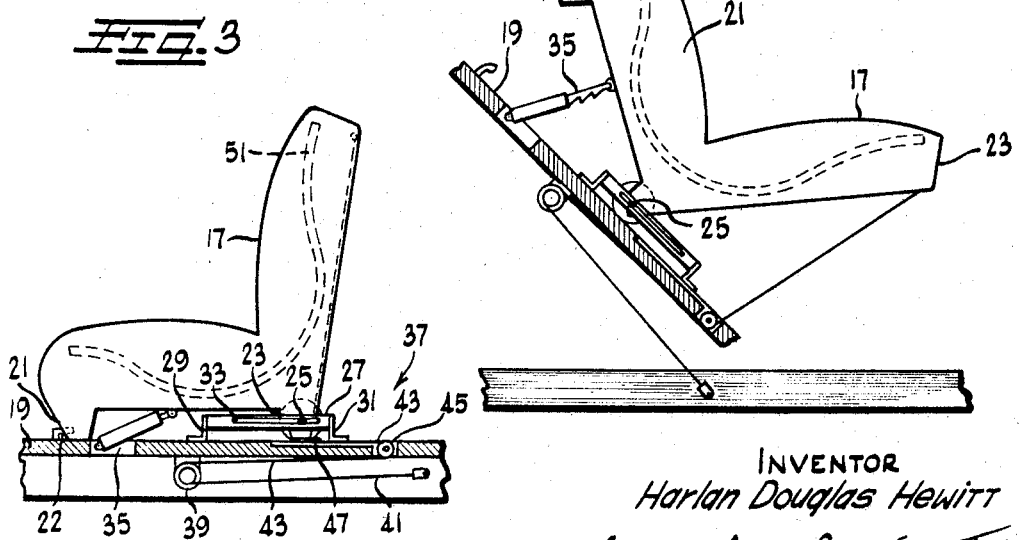
INVENTOR
Harlan Douglas Hewitt
Anderson, Luedeka, Fitch, Even, & Tabin
ATTORNEYS

3,423,124
SAFETY SEAT FOR AUTOMOBILE
Harlan D. Hewitt, 1210 Astor St., Chicago, Ill. 60610
Filed Nov. 8, 1967, Ser. No. 681,398
U.S. Cl. 296—65　　　　　　　　　　　　3 Claims
Int. Cl. B60n 1/02; B60r 21/10

ABSTRACT OF THE DISCLOSURE

A safety construction for vehicles wherein a separable passenger compartment is releasably secured to a chassis, and a passenger seat inside the passenger compartment is constructed so as to tilt rearwardly upon separation of the passenger compartment to thereby aid in absorption of collision forces imposed on the passenger.

---

This invention relates to the safety construction of vehicles. More particularly, it relates to a safety construction for vehicles which is specifically designed to protect the passengers contained within said vehicle in the event of high speed impacts or collisions.

Modern vehicles with their large displacement engines and high horsepower ratings have tended to increase the dangers to life and limb of passengers who rely on these vehicles for their means of transportation.

Recently, manufacturers have developed certain safety devices which are designed to reduce injury to passengers which result from high speed collisions or impact. More specifically, automotive manufacturers have provided padded dashboards and sun visors, as well as collapsible steering columns and seat belts.

Unfortunately, these safety features have only had limited effectiveness. Use of these devices in an automobile for example, has tended to reduce serious or fatal injury to passengers, provided collision or impact takes place at reduced speeds. However, in cases of high speed impact these devices have sometimes been ineffective in preventing serious injury to passengers. These undesirable results can be attributed to the almost instantaneous deceleration to zero velocity of the vehicle which causes the passengers to be thrown forward at a velocity approximately equal to that of the vehicle prior to impact. Upon impact, the front end components absorb the kinetic energy of the vehicle; however, there must also be something to absorb the kinetic energy of the passengers so as to decelerate them after impact. Padded dashboards and seat belts are ineffective at high speeds to decelerate the passengers at such a rate that the shock of rapid deceleration may be safely absorbed.

An improved vehicle for minimizing injury to passengers under such circumstances is disclosed and claimed in my prior patent, No. 3,162,479, issued December 22, 1964. The present application is directed toward a further improvement thereon.

Accordingly, it is the principal object of the present invention to provide an improved vehicular construction for reducing the incidence of injury to occupants.

A further object of the invention is to provide an improved seat for vehicular construction which will aid in absorbing the kinetic energy of the decelerating passengers upon high speed impact and which will re-position the passenger so that his own neural and skeletal structure and natural musculature will contribute to the absorption of energy while, at the same time, the skull, spinal column, abdomen, etc., are offered a maximum of protection as the said passenger is implemented toward his natural prenatal posture.

It is a still further object of the present invention to provide an improved safety seat for vehicular construction which improves the protection afforded passengers riding in the vehicle without changing the exterior appearance thereof.

Other objects and advantages of the invention will become apparent through reference to the following description and accompanying drawings which shows an illustrative embodiment of the invention.

In the drawings:

FIGURE 1 is an elevational view of the vehicle prior to impact with another object showing various features of the present invention.

FIGURE 2 is an elevational view of the vehicle immediately after impact with another object showing the passenger compartment of the vehicle in a displaced position.

FIGURE 3 is a schematic elevational view of the seat of the passenger compartment prior to impact with another object showing the seat in its normal position.

FIGURE 4 is a schematic elevational view of the seat immediately after impact with another object showing the seat in its displaced position.

Very generally, the illustrated embodiment includes an automotive vehicle 11 comprising a chassis 13, a passenger compartment 15 releasably secured to the chassis, and a seat 17 inside the passenger compartment. Upon high speed impact, the passenger compartment 15 breaks away from its normal position on the chassis 13 and continues to move relative to the chassis until it has been controllably decelerated and brought to rest in a tilted position relative to the ground.

The vehicle construction is particularly adapted to automotive applications and will be described with relation thereto although it has, of course, numerous other applications such as airborne vehicles and other passenger transporting conveyances.

More specifically, and as shown in FIGURE 1, the vehicle 11 is so constructed that its outward appearance is no different from a conventional automobile. Minor bumps or collisions at speeds where seat belts or other safety features of conventional vehicles give adequate protection do not release the passenger compartment from its fixed position on the chassis. However, in the event of a collision at high speed where even the protection afforded by seat belts is insufficient, the passenger compartment 15 is released from the chassis 13 and allowed to travel in the direction of movement of the vehicle prior to impact, substantially as disclosed in United States Letters Patent No. 3,162,479 issued December 22, 1964, for an Automobile Construction For Safety Decelerating Passengers Upon High Speed Impact, the disclosure thereof being incorporated herein by reference.

As shown generally in FIGURE 2, forward movement of the passenger compartment 15 relative to the chassis 13 upon high speed impact causes the seat 17 to tilt rearwardly as will be hereinafter more fully described. The rearward tilting of the safety seat aids in the absorption of forces imposed on the passengers, thus further reducing the chances of injury to the passengers.

In FIGURE 3 the seat 17 is illustrated in its normal position within the passenger compartment. The seat is disposed on the floor 19 of the passenger compartment, and is supported on legs 21 and 23. The front leg 21 of the seat rests on the floor, without attachment thereto. An axle 25 extends through the rear leg and through a track 27 which is secured to the floor by brackets 29 and 31. The axle extends through a slot 33 formed in the track.

The seat 17 is connected to the floor 19 of the passenger compartment 15 by limiting means 35 which comprises an extensible rod. The limiting means 35 is attached to the seat about midway from the front to the back, and is suitably secured to the floor 19.

Connecting means 37 is also provided between the rear of the seat and the chassis 13. It comprises a pulley 39 rotatably mounted on the floor 19 of the passenger compartment and first and second cables 41 and 43, respectively, attached thereto. One end of the first cable 41 is secured to the chassis 13 and the other end is trained around one of two sheaves of the pulley 39. The sheaves are of different diameters, and the first cable is attached to the smaller diameter sheave. The second cable 43 is attached to the larger diameter sheave and thence is trained around a second pulley 45 also rotatably mounted on the floor 19 of the passenger compartment. The second cable 43 then extends along the floor 19 and along the back of the seat 17 to its point of fixed attachment to the seat adjacent the top thereof.

The second pulley 45 and the second cable 43 are recessed in the floor of the passenger compartment so that they are not visible under normal conditions. The cable is maintained in such concealed position in the floor, and in adjacent relation to the back of the seat by a retainer 47 which readily releases upon being subjected to cable tension.

In FIGURE 4 the seat 17 is illustrated in its tilted position, which is brought about by movement of the passenger compartment 15 relative to the chassis 13. Upon such relative movement, the first cable 41 effects rotation of the pulley 39 which in turn winds the second cable about the larger sheave of the pulley. Inasmuch as the sheaves are of different diameter, the second cable is taken up on the sheave at a faster rate.

Taking up of the second cable, in turn, first causes the cable to be released from the retainer 47, and as it is taken up further, causes the seat 17 to be tilted rearwardly.

Simultaneous with such rearward tilting of the seat, the seat slides forward and upward along the track 27. Tilting of the seat is limited by the limiting means 35, so that the seat comes to rest in the approximate position illustrated in FIGURE 4. As soon as the seat reaches the position illustrated in FIGURE 4, the limiting means 35 is so ratcheted and of sufficient strength that it thereupon becomes the factor holding the seat in the desired position against the heavy forces of deceleration of seat and passenger. The tensile strength of that section of cable 43 originally wound on the pulley 39 is selected such that it will separate when the limit of movement of the seat is reached, as limited by the limiting means. It will thus be seen that, upon impact of the vehicle of sufficient intensity to cause movement of the passenger compartment 15, relative to the chassis 13, the seat 17 is shifted into a position which further protects the passenger from injury. The forces of deceleration are thereby further attenuated to provide increased safety. The change in position of the seat must be accomplished sufficiently rapidly to arrive at the position shown in FIGURE 4 before the passenger is impelled forwardly, and this is accomplished by the provision of the two-sheave pulley 39, which accelerates such change.

It should be noted, too, that while the use of pulleys and cables as a means of impelling the mechanism and of transferring power from the separating body and chassis to the seat or seats is used herein to illustrate the principle of the protective seat, it is not the only available means for transferring such power or such implementation. Other means which could be adapted to this purpose include a sealed hydraulic cylinder, a gear wheel arrangement with eccentric gear or gears or shaft or shafts, electrical implementation of a measured explosive or rapidly-burning composition in a sealed cylinder with piston shaft and other power transfer or implementation devices located in any of several different locations. The innovation discussed in this application relates primarily to the movement of the seats, its relation to the changing direction of the car body and its implementation from the changing relation of the car body and chassis or from the measured and intensive deceleration of the chassis at the time of dangerous impact.

Also illustrated diagrammatically in FIGURES 3 and 4 is a form 51 which may be incorporated into the construction of the seat 17 to further reduce the possibility of injury to passengers upon impact. The form 51, which may be constructed of reinforced plastic, steel, etc., is contained beneath the cushioning and springs conventionally used on automobile seats, but does not itself contribute to support of the person under normal circumstances. However, upon impact of the automobile which brings into operation tilting of the seat 17 in accordance with the present invention, the form 51 cradles the passenger in a position which maximizes the natural ability of the person's skeleton and musculature to withstand stress.

In this connection, the shape of the form 51 is such that when the seat 17 is in its tilted position (FIGURE 4) and the passenger is being subjected to the forces of deceleration he will be impelled against the form 51 and cradled in a position approximately the prenatal position. (The cushioning of the conventional seat materials is quite ineffective under such deceleration forces, and will merely collapse against the form 51.) In the pre-natal position the human body has the greatest ability to withstand trauma, and is remarkably able to absorb stresses which, if imposed when the body were differently positioned, would cause severe injury. This feature, while not essential to the practice of the present invention, is nevertheless advantageously incorporated.

Various features of the present invention are set forth in the following claims.

What is claimed is:

1. In a motor vehicle, the safety construction which comprises the combination of: a chassis; a passenger compartment releasably secured to the chassis so that upon impact of the chassis with an obstruction the passenger compartment is released from its fixed position for controlled forward movement relative to the chassis; a passenger seat disposed within said passenger compartment adapted to tilt rearwardly; and connecting means attached to the safety seat and to the chassis, said connecting means causing said safety seat to tilt rearwardly upon movement of the passenger compartment relative to the chassis, whereby physical injury to passengers will be reduced.

2. Apparatus in accordance with claim 1 wherein said connecting means comprises a first cable attached to said chassis and a second cable attached to said seat, said first and second cables being trained about a common pulley.

3. Apparatus in accordance with claim 2 wherein said first cable is trained around a first sheave of said pulley and said second cable is trained around a second sheave of said pulley having a larger diameter than said first sheave.

References Cited

UNITED STATES PATENTS 2,736,566 2/1956 Hartl.
2,818,909 1/1958 Burnett _____ 296—65 XR
3,162,479 12/1964 Hewitt _____ 296—35

BENJAMIN HERSH, *Primary Examiner.*

L. DANIEL MORRIS, JR., *Assistant Examiner.*

U.S. Cl. X.R.
297—216